(12) United States Patent
Zhou et al.

(10) Patent No.: US 9,099,118 B1
(45) Date of Patent: Aug. 4, 2015

(54) DUAL DAMASCENE PROCESS FOR PRODUCING A PMR WRITE POLE

(75) Inventors: Ronghui Zhou, Fremont, CA (US); Ming Jiang, San Jose, CA (US); Guanghong Luo, Fremont, CA (US); Yun-Fei Li, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 1356 days.

(21) Appl. No.: 12/472,341

(22) Filed: May 26, 2009

(51) Int. Cl.
G11B 5/127 (2006.01)
H04R 31/00 (2006.01)
G11B 5/31 (2006.01)

(52) U.S. Cl.
CPC ............ *G11B 5/3169* (2013.01); *G11B 5/1278* (2013.01); *G11B 5/3116* (2013.01); *G11B 5/3163* (2013.01); *G11B 5/313* (2013.01); *Y10T 29/49046* (2015.01)

(58) Field of Classification Search
CPC .. G11B 5/3169; G11B 5/3163; G11B 5/3116; G11B 5/1278; G11B 5/313; Y10T 29/49046
USPC ............ 29/603.07, 603.16, 603.18, 846, 849, 29/853
See application file for complete search history.

(56) References Cited

U.S. PATENT DOCUMENTS

| | | |
|---|---|---|
| 4,274,022 A | 6/1981 | Elsel |
| 4,404,609 A | 9/1983 | Jones, Jr. |
| 4,546,398 A | 10/1985 | Toda et al. |
| 4,636,897 A | 1/1987 | Nakamura et al. |
| 4,646,429 A | 3/1987 | Mori |
| 4,779,463 A | 10/1988 | Woodruff |
| 4,855,854 A | 8/1989 | Wada et al. |
| 4,943,882 A | 7/1990 | Wada et al. |
| 5,027,247 A | 6/1991 | Nakanishi |
| 5,181,151 A | 1/1993 | Yamashita et al. |
| 5,225,953 A | 7/1993 | Wada et al. |
| 5,393,233 A | 2/1995 | Hong et al. |
| 5,578,857 A | 11/1996 | Hong et al. |
| 6,063,711 A * | 5/2000 | Chao et al. ..................... 438/724 |
| 6,072,672 A | 6/2000 | Westwood |
| 6,211,090 B1 * | 4/2001 | Durlam et al. ................ 438/692 |
| 6,261,918 B1 | 7/2001 | So |
| 6,292,329 B1 | 9/2001 | Sato et al. |
| 6,315,839 B1 | 11/2001 | Pinarbasi et al. |
| 6,353,995 B1 | 3/2002 | Sasaki et al. |
| 6,391,757 B1 | 5/2002 | Huang et al. |
| 6,433,970 B1 | 8/2002 | Knapp et al. |
| 6,475,062 B1 | 11/2002 | Kubota et al. |
| 6,501,619 B1 | 12/2002 | Sherrer et al. |
| 6,504,675 B1 | 1/2003 | Shukh et al. |
| 6,513,228 B1 | 2/2003 | Khizroev et al. |
| 6,522,007 B2 | 2/2003 | Kouno et al. |
| 6,564,445 B1 | 5/2003 | Hashimoto et al. |
| 6,587,314 B1 | 7/2003 | Lille |
| 6,709,322 B2 | 3/2004 | Saldana et al. |
| 6,740,471 B1 | 5/2004 | Lu et al. |
| 6,743,642 B2 | 6/2004 | Costrini et al. |

(Continued)

Primary Examiner — Peter DungBa Vo
Assistant Examiner — Jeffrey T Carley

(57) ABSTRACT

Methods of forming a write pole are disclosed. A structure comprising a bottom insulating layer and a top insulating layer is provided. A top damascene trench is formed in the top insulating layer, and a bottom damascene trench is formed in the bottom insulating layer. The bottom damascene trench and a portion of the top damascene trench are filled with a pole material. The top insulating layer and a portion of the pole material located above the bottom damascene trench are removed.

10 Claims, 4 Drawing Sheets

(56) References Cited

U.S. PATENT DOCUMENTS

| | | |
|---|---|---|
| 6,751,054 B2 | 6/2004 | Sato et al. |
| 6,757,141 B2 | 6/2004 | Santini et al. |
| 6,784,548 B2 | 8/2004 | Kouno et al. |
| 6,807,027 B2 | 10/2004 | McGeehin et al. |
| 6,808,442 B1 | 10/2004 | Wei et al. |
| 6,809,899 B1 | 10/2004 | Chen et al. |
| 6,833,979 B1 | 12/2004 | Knapp et al. |
| 6,836,957 B2 | 1/2005 | Kobayashi |
| 6,843,707 B2 | 1/2005 | Saldana et al. |
| 6,876,518 B2 | 4/2005 | Khizroev et al. |
| 6,876,519 B1 | 4/2005 | Litvinov et al. |
| 6,952,867 B2 | 10/2005 | Sato |
| 6,962,771 B1 | 11/2005 | Liu et al. |
| 7,029,376 B1 | 4/2006 | Guthrie et al. |
| 7,127,801 B2 * | 10/2006 | Lahiri et al. ............... 29/603.16 |
| 7,206,166 B2 | 4/2007 | Notsuke et al. |
| 7,227,720 B2 | 6/2007 | Sasaki et al. |
| 7,248,434 B2 | 7/2007 | Dill et al. |
| 7,288,487 B1 | 10/2007 | Kang et al. |
| 7,296,339 B1 | 11/2007 | Yang et al. |
| 7,370,405 B2 | 5/2008 | Kuroda et al. |
| 7,508,627 B1 | 3/2009 | Zhang et al. |
| 7,518,824 B2 | 4/2009 | Sasaki et al. |
| 7,552,523 B1 | 6/2009 | He et al. |
| 2001/0008501 A1 | 7/2001 | Sekine |
| 2001/0035357 A1 | 11/2001 | Sasaki |
| 2002/0006013 A1 | 1/2002 | Sato et al. |
| 2002/0012195 A1 | 1/2002 | Lahiri et al. |
| 2002/0012196 A1 | 1/2002 | Obara |
| 2002/0151254 A1 | 10/2002 | Saldana et al. |
| 2002/0190382 A1 | 12/2002 | Kouno et al. |
| 2002/0191336 A1 | 12/2002 | Hsiao et al. |
| 2003/0039064 A1 | 2/2003 | Khizroev et al. |
| 2003/0071263 A1 | 4/2003 | Kouno et al. |
| 2003/0117749 A1 | 6/2003 | Shukh et al. |
| 2003/0203510 A1 | 10/2003 | Hineman et al. |
| 2004/0001283 A1 | 1/2004 | Fontana et al. |
| 2004/0008446 A1 | 1/2004 | Schmidt |
| 2004/0008451 A1 | 1/2004 | Zou et al. |
| 2004/0032692 A1 | 2/2004 | Kobayashi |
| 2004/0102138 A1 | 5/2004 | Saldana et al. |
| 2004/0150912 A1 | 8/2004 | Kawato et al. |
| 2004/0161576 A1 | 8/2004 | Yoshimura |
| 2004/0252415 A1 | 12/2004 | Shukh et al. |
| 2005/0011064 A1 | 1/2005 | Lee |
| 2005/0024779 A1 | 2/2005 | Le et al. |
| 2005/0068671 A1 | 3/2005 | Hsu et al. |
| 2006/0044681 A1 | 3/2006 | Le et al. |
| 2006/0139802 A1 | 6/2006 | Sasaki et al. |
| 2006/0168603 A1 | 7/2006 | Goto |
| 2008/0080233 A1 | 4/2008 | Hosotani et al. |
| 2008/0148301 A1 | 6/2008 | Masaoka et al. |
| 2008/0184278 A1 | 7/2008 | Leigh et al. |
| 2008/0316644 A1 | 12/2008 | Lee et al. |

* cited by examiner

DUAL DAMASCENE PROCESS FOR PRODUCING A PMR WRITE POLE

FIELD OF THE INVENTION

The present invention generally relates to magnetic recording heads and, in particular, relates to a dual damascene process for producing perpendicular magnetic recording (PMR) write poles.

BACKGROUND OF THE INVENTION

Damascene processes may be used to "build up" structures for use in a hard drive head, such as a write pole, as opposed to methods which rely upon material removal to form such 3D structures. As applied to formation of PMR writing heads, the damascene process involves forming grooves or trenches in a material, and then depositing (e.g., electroplating) a pole material into the trenches to form write poles. FIG. 1 illustrates a prior art single damascene process. This process involves: 1) providing a trench with targeted angle and track width via, e.g., reactive-ion etching (RIE); 2) depositing multiple layers of thin films including a seed (e.g., ruthenium) layer, to build a narrower trench to control the final pole shape and track width; 3) forming a framed layer 110 by applying a photolithography process (e.g., depositing and photo-developing a photoresist material) to open only the device area for the pole material plating, and then filling the device area through the framed layer with a pole material (e.g., CoNiFe) via a electroplating process; 4) removing the photoresist material by a photo strip; 5) depositing and patterning a chemical-mechanical planarization (CMP) stop layer, e.g., diamond-like-carbon (DLC), followed by deposition of alumina; 6) applying a CMP process to planarize the surface on the diamond-like-carbon; and 7) removing the DLC via, e.g., RIE.

This damascene process scheme may suffer from potential photoresist residue problems. As indicated above, to define the framed layer, the area around the pole is subjected to a photolithography process. Some photoresist residue may remain on the side wall of the poles after the photo developing and stripping. Such photoresist residue can result in poor pole finishing and even device failures. Moreover, it is important to reduce the track width variation of the write poles of the magnetic heads within a wafer and between wafers for high areal density. With the prior art damascene process described above, the standard deviation (1 sigma) of track width may only be controlled to about 10 nm.

SUMMARY OF THE INVENTION

Various embodiments of the present invention solve the foregoing problems by providing a dual damascene process involving top and bottom damascene trenches. This dual damascene process enables full film write pole material plating without any photo processes, and allows for the pole material to be removed without damaging a CMP stop layer between the top and bottom trenches. With the CMP stop layer undamaged, a CMP operation can be used to remove the excess pole material and to accurately form write poles with desired track widths. This approach provides a reliable method of forming PMR heads, greatly reducing defects and eliminating complexity in the wafer processing of PMR heads, and can also reduce the sigma associated with the track width variation below 5 nm (average 2-3 nm).

According to one embodiment of the subject disclosure, a method of producing magnetic recording heads on a wafer is provided. The method comprises providing a structure comprising a first media layer over a substrate, a first mask layer having a plurality of first patterned openings over the first media layer, a second media layer over the first mask layer, and a second mask layer having a plurality of second patterned openings over the second media layer. The method further comprises removing material from the second media layer below the second patterned openings and material from the first media layer below the first patterned openings, whereby a plurality of top damascene trenches over a corresponding plurality of bottom damascene trenches are formed. The method further comprises depositing a pole material, whereby the plurality of bottom damascene trenches and at least portions of the plurality of top trenches are filled with the pole material. The method further comprises removing the second mask layer, the second media layer, and a portion of the pole material disposed above the first mask layer.

According to another embodiment of the subject disclosure, a method of forming a write pole is disclosed. The method comprises providing a structure comprising a bottom insulating layer and a top insulating layer. The method further comprises forming a top damascene trench in the top insulating layer and a bottom damascene trench in the bottom insulating layer. The method further comprises filling the bottom damascene trench and a portion of the top damascene trench with a pole material. The method further comprises removing the top insulating layer and a portion of the pole material located above the bottom damascene trench.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
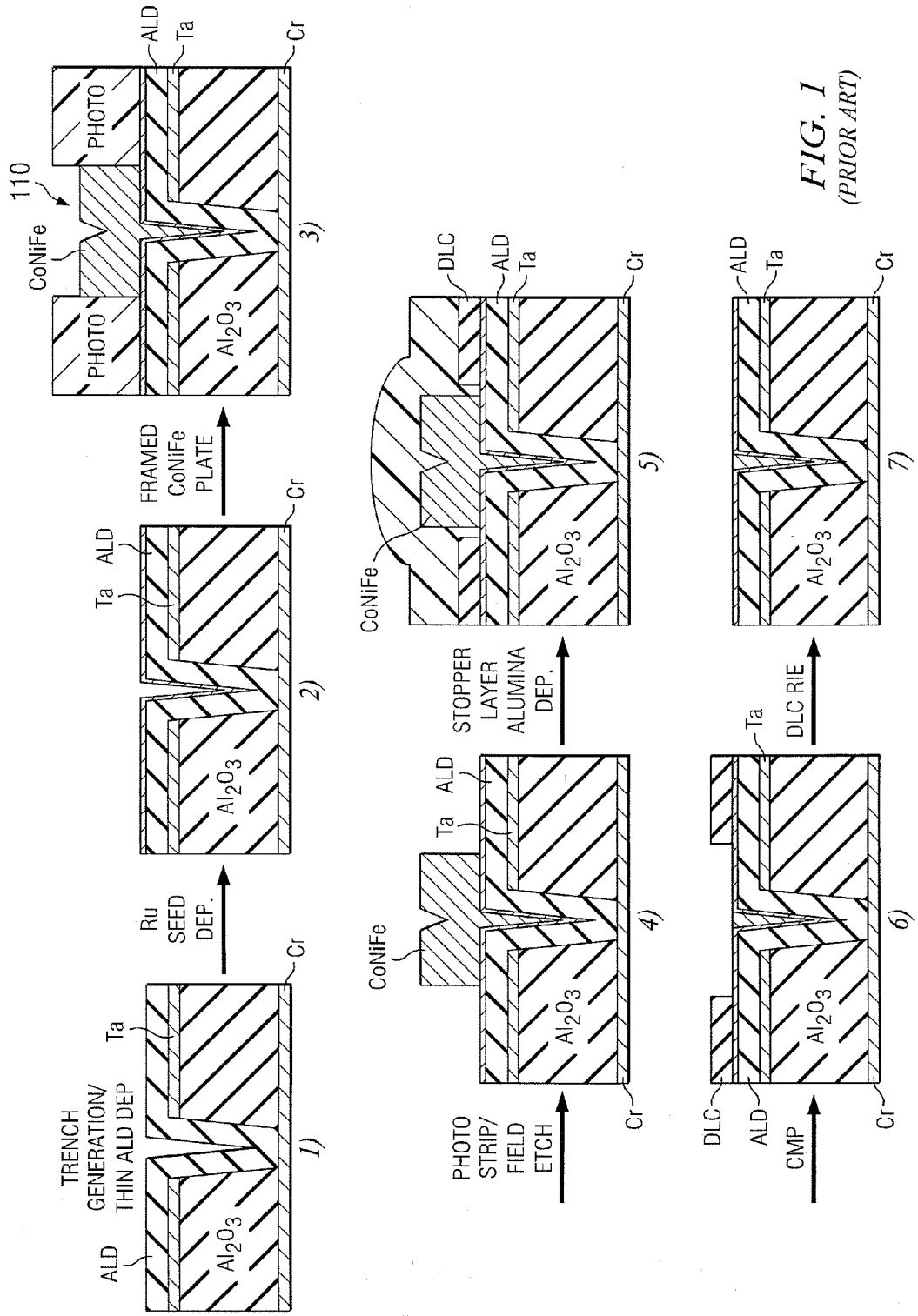
FIG. 1 illustrates a prior art damascene process scheme that involves a photo process for defining a framed pole layer.
Figure 2:
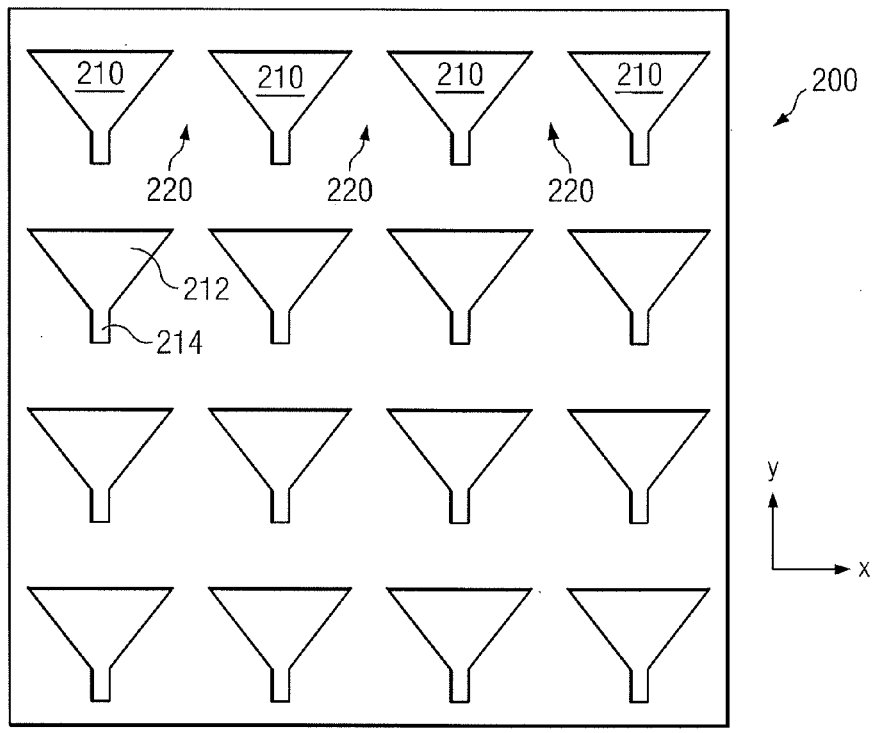
FIG. 2 is a top view of a wafer comprising a plurality of dual (top and bottom) damascene trenches formed in one or more layers of materials before a pole material is deposited thereon.

A multitude of PMR heads may be simultaneously produced via a wafer fabrication process. FIG. 2 is a top view of a wafer 200 comprising a plurality of dual (top and bottom) damascene trenches formed in one or more layers of materials (e.g., $Al_2O_3$ and Ta) before a pole material is deposited thereon. Exemplary methods by which the dual damascene trenches may be provided in a substrate are provided below with respect to FIGS. 3A-3B and 4A-4B. After the trenches are formed, the wafer, viewed from the top, comprises trenched areas 210 comprising the dual damascene trenches, and remaining field areas 220. Each of the trenched areas 210 comprises an upper pole section 212 and a relatively narrow pole tip section 214. The field areas 220 are substantially planar. In those cases in which the trenches have a "V"-shaped cross section when viewed, e.g., from y direction, the trenched areas 210 are sloped at least in some sections thereof.

Figures 3A, 3B:
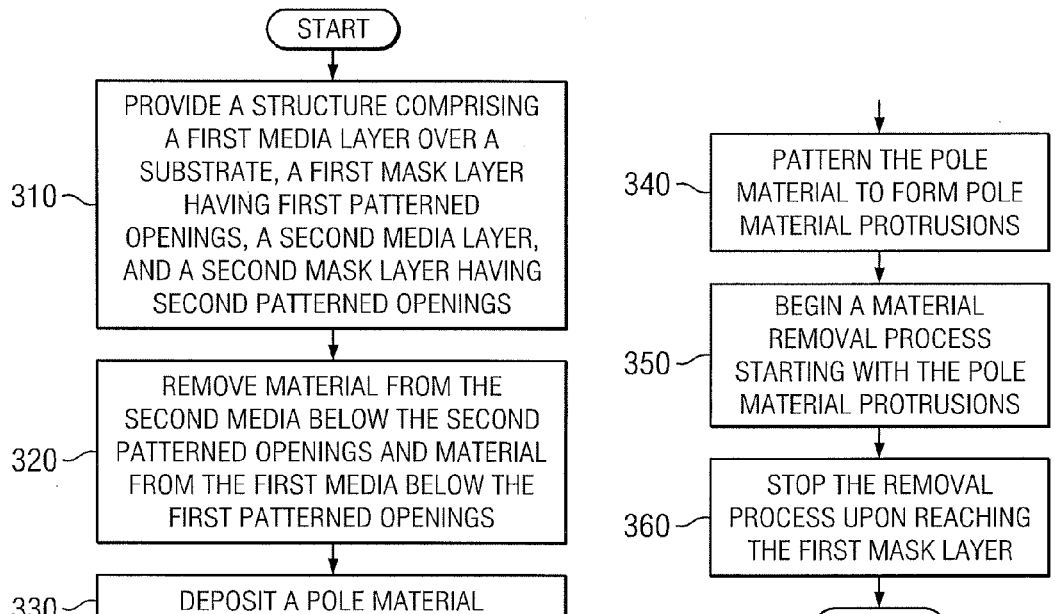
FIGS. 3A-B are a continued flowchart illustrating an exemplary fabrication process for producing a wafer comprising dual damascene trenches such as the wafer shown in FIG. 2 and for subsequently producing a plurality of PMR heads having write poles on the wafer, in accordance with one aspect of the present disclosure.
Figure 4A:
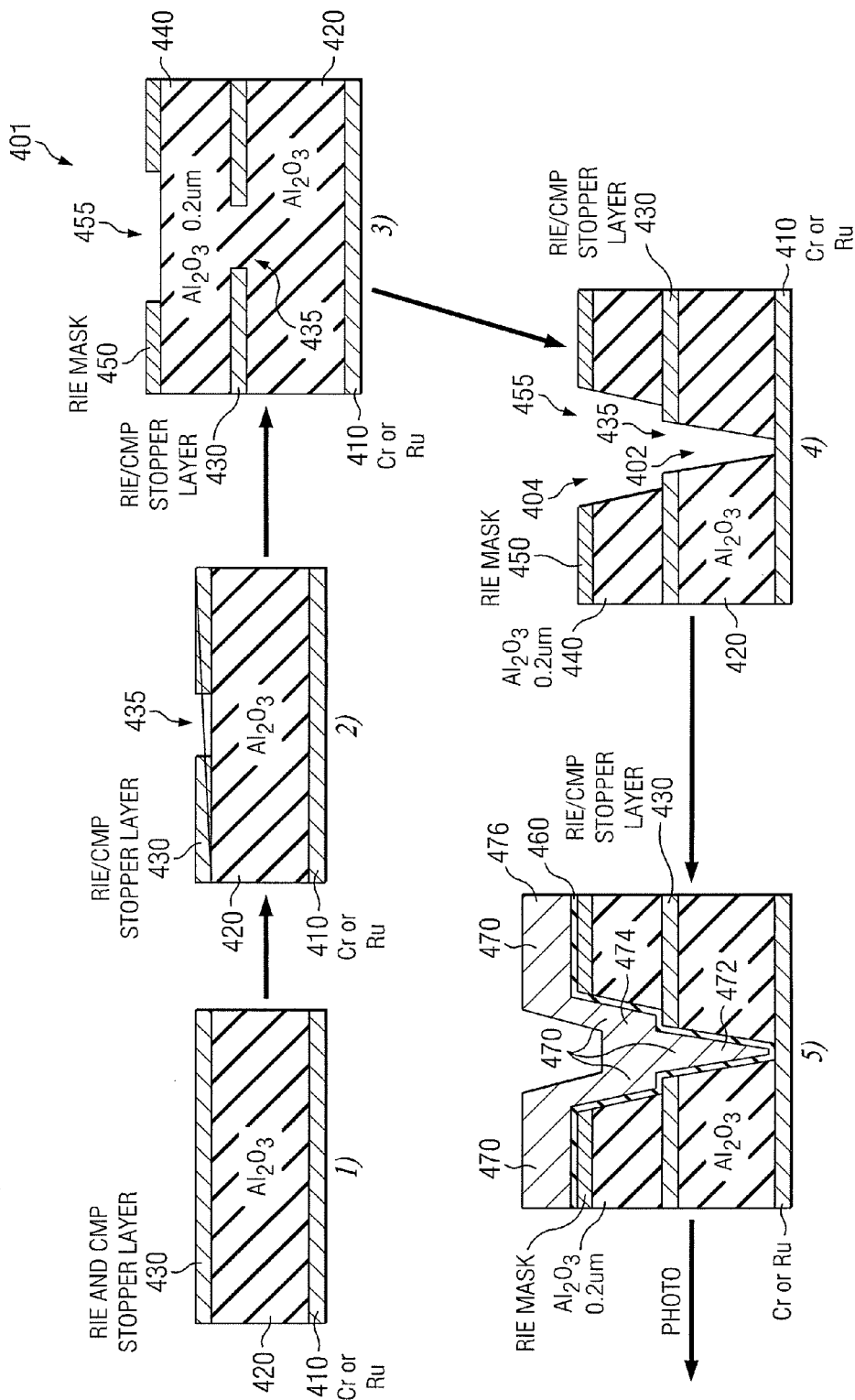
FIGS. 4A-B are a series of figures representing intermediate structures arrived between or after different processing steps of the exemplary wafer fabrication process illustrated by FIGS. 3A-B.
Figure 4B:
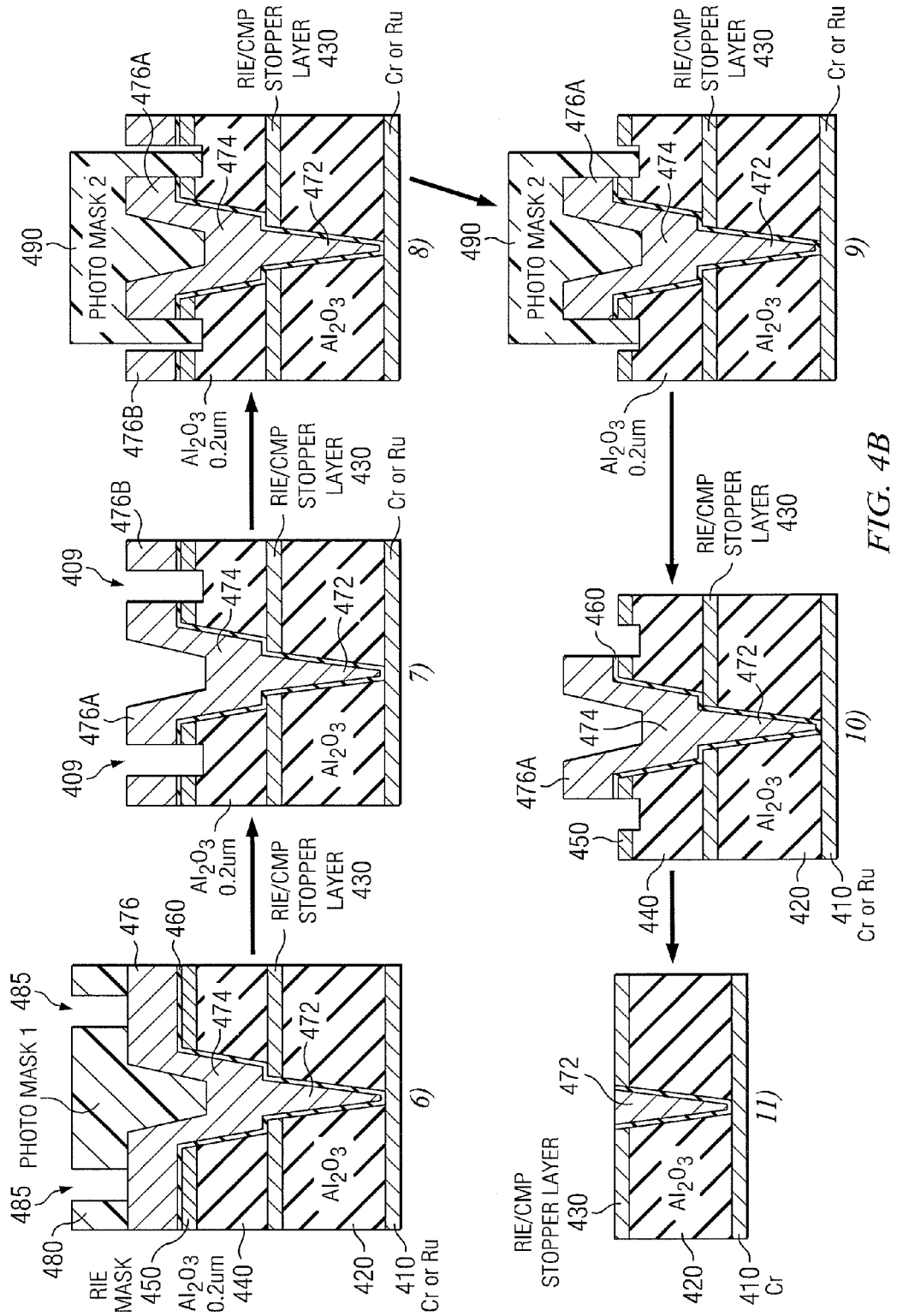

FIGS. 3A-B constitute a continued flowchart illustrating an exemplary fabrication process 300 for producing a wafer comprising dual damascene trenches such as the wafer 200 shown in FIG. 2 and for subsequently producing a plurality of PMR heads having write poles on the wafer, in accordance with one aspect of the present disclosure. FIGS. 4A-B are a series of figures (subfigures 1-11) representing structures resulting after different processing steps of the exemplary wafer fabrication process 300 illustrated by FIGS. 3A-B. It shall be appreciated that, for the sake of simplicity, FIGS. 4A-B focus on the fabrication of one PMR head among the plurality of PMR heads on the wafer. As such, a reference to one element of the structures shown in FIGS. 4A-B related to one PMR head shall be understood as being applied to the same element in all PMR heads being formed on the wafer.

The process 300 begins at step 310, in which a structure 401 (subfigure 3 of FIG. 4A) comprising a first media layer 420 over a substrate 410, a first mask layer 430 having a plurality of first patterned openings 435 over the first media layer 420, and a second media layer 440 over the first mask layer 430, and a second mask layer 450 having a plurality of second patterned openings 455 is provided as illustrated in subfigures 1-3. Each of the plurality of second patterned openings 455 are located above a corresponding one of the plurality of first patterned openings 435. In the illustrated example, the substrate 410 includes a layer formed of chromium (Cr), but the layer may be formed of another metal including ruthenium (Ru). The first media layer 420 and the second media layer 440 are shown to be Alumina ($Al_2O_3$), but may be formed of another insulating material including silicon oxide ($SiO_2$). The first mask layer 430 serves as a mask layer for a reactive ion etching (RIE) process to form lower damascene trenches (see subfigure 4 of FIG. 4A) and also as a CMP stop layer (see subfigure 11 of FIG. 4B). Material(s) for the first mask layer 430 can be advantageously chosen to fulfill these dual functions. Non-limiting examples of materials that can be used for the first mask/stop layer 430 include Ruthenium (Ru) and other CMP stop layer materials such as chromium (Cr), tantalum (Ta), titanium (Ti), and tungsten (W). The second mask layer 450 serves as a mask layer for the RIE process to form the upper damascene trenches (see subfigure 4 of FIG. 4A). Non-limiting examples of materials that can be used for the second mask layer such as NiFe. Methods for patterning mask/stop layers such as the first mask layer 430 and the second mask layer 450 are well-known in the art, and are not discussed herein for the sake of brevity.

The process 300 proceeds to step 320, in which material from the second media layer 440 below the second patterned openings 455 and material from the first media layer 420 below the first patterned openings 435 are removed to form a plurality of top damascene trenches 404 and a plurality of bottom damascene trenches 402 as illustrated in subfigure 4 of FIG. 4A. In the illustrated example, the bottom damascene trench 402 extends vertically from the top of the substrate 410 to the top of the first mask layer 430; and the top damascene trench 404 extends vertically from the top of the first mask layer 430 to the top of the second mask layer 450. In certain embodiments, the removal of the materials from the first and second media layers 420 and 440 in step 320 is achieved by an etching process such as reactive ion etching (RIE). The sizes of the first and second patterned openings 435, 455 and etching parameters (e.g., ion beam angles and power levels for the RIE process) can be appropriately selected to achieve a desired angle and a desired width for the bottom damascene trench 402 where the write pole is to be formed.

The process 300 proceeds to step 330, in which a pole material 470 is deposited across the whole wafer, including in the bottom damascene trench 402 and in and above the top damascene trench 404, without any photo process, as illustrated in subfigure 5 of FIG. 4A. As used herein, the term "deposition" refers to any process that grows, coats, or otherwise transfers a material onto the wafer. Non-limiting examples of deposition processes include physical vapor deposition (PVD), chemical vapor deposition (CVD), electrochemical deposition (ECD), molecular beam epitaxy (MBE), atomic layer deposition (ALD), and electroplating. In certain embodiments, the pole material 470 is electroplated. In some of such embodiments, a seed layer such as the layer 460 is deposited across the whole wafer prior to the electroplating of the pole material 470. The pole material 470 can be any soft magnetic material having a high magnetic moment, e.g., in excess of 2.0 T. In some embodiments, the pole material 470 may be cobalt nickel iron (CoNiFe). In other embodiments, the pole material 470 can be other combination of cobalt (Co), nickel (Ni), and/or iron (Fe), such as CoFe or NiFe.

For the purpose of illustration, the deposited pole material (PM) 470 is classified into the following three parts: 1) a first PM part 472 deposited in the bottom damascene trench 402, 2) a second PM part 474 deposited in the top damascene trench 404 (up to the top of the seed layer 460), and a third PM part 476 deposited over the top of the second mask layer 450 (above the seed layer 460).

The process 300 proceeds to step 340, in which the third PM part 476 is patterned to form a plurality of pole material (PM) protrusions 476A. In the illustrated example, this is achieved by the steps illustrated in subfigures 6-10 of FIG. 4B. First, a first photo mask 480 having patterned openings 485 are formed above the third PM part 476 as illustrated in subfigure 6. Next, trenches 409 are formed in the third PM part 476, the seed layer 460, and an upper portion of the second media layer 440 below the patterned openings 485 by, e.g., an etching process such as ion mill or ion beam etching (IBE), as illustrated in subfigure 7. At this stage, the third PM part 476 is divided into PM protrusion 476A centered about the dual damascene trenches 402, 404 (subfigure 4) and a remaining side portion 476B of the third PM part 476. Next, a patterned second photo mask 490 that encapsulates the PM protrusion 476A is formed as illustrated in subfigure 8. Next, the side portion 476B of the third PM part 476 is removed along with portions of the seed layer 460 below the side portion 476B by, for example, a wet etching process, as illustrated in subfigure 9. Next, the second photo mask 490 surrounding the PM protrusions 476A is removed as illustrated in subfigure 10. The relatively small PM protrusions and the pole material in the second PM part 474 surrounded by the Al₂O₃ sidewalls are conducive to a more uniform CMP removal due to short polishing time and high planarization efficiency.

The process 300 proceeds to step 350, in which a material removal process is applied to the structure of subfigure 10, beginning with the PM protrusions 476A. As used herein, the term "removal" refers to any process that removes a material from the wafer. Non-limiting examples of removal processes include a milling process such as an ion beam etching (IBE), e.g., reactive ion etching (RIE); and a polishing process such as chemical-mechanical polishing (CMP). In certain embodiments, the material removal process is performed using a polishing process such as a CMP process.

The process 300 proceeds to step 360, in which the removal process (e.g., CMP process) is stopped upon reaching the first mask/stop layer 430 as illustrated in subfigure 11 after removing the second mask layer 450, the second media layer 440, and a portion of the pole material 470 disposed above the first mask layer 430, namely, the second PM part 474 and the PM protrusions 476A. For example, the CMP process is carried out until materials in the second PM part 474, the seed layer 460, and the second media layer 440 disposed above the first mask layer 430 are completely removed, e.g., by applying the CMP process for a predetermined time under predetermined conditions, or until the first mask layer 430 also acting as a CMP stop layer is detected (e.g., by a change in polishing rate, or with any other end-point detection). The first PM part 472 deposited in the bottom damascene trench 402 that remains after the termination of the removal process constitutes the write pole for the PMR.

Some of the advantages that can accrue from various embodiments of the dual damascene process disclosed herein are now described. Because the dual damascene process described above does not employ a photo process for the deposition of the pole material, there is no issue of photo mask residues remaining in the write pole. The top damascene trench 404 helps to create a leveled pattern with the pole material surrounded with the Al₂O₃ sidewall of the top damascene trench 404. The Al₂O₃ sidewall of the top damascene trench 404 also provides a good buffer layer to achieve integrity around the second PM part 472, thereby avoiding potential non-uniformity and dishing due to IBE or other etching processes. In contrast to the prior art single damascene process, certain embodiments of the dual damascene process of the present disclosure do not rely on having a separate CMP stop layer in addition to a mask layer, which can introduce delamination. The potential delamination problem is obviated by the use of a single mask/stop layer (e.g., the first mask layer 430) that functions both as a mask layer for the RIE process and as a stop layer for the CMP process.

In those embodiments, the dual damascene process of the present disclosure provides a repeatable and accurate CMP stop point by preserving the structural integrity (e.g., surface evenness and thickness uniformity) of the first mask/stop layer 430. This is because the first mask/stop layer 430 is fully protected from an etching process such as RIE and IBE while the bottom damascene trenches 402 and pole material 476A are being formed. If the second media layer 440 surrounding the top damascene trench 404 were not present, the RIE and IBE process could damage the first mask/stop layer 430 by introducing certain irregularities, such as surface unevenness and/or thickness variations, to the first mask/stop layer 430. Such irregularities of CMP stopper layer would have produced corresponding non-repeatability and inaccuracy in the CMP stop point, which, in turn, would have resulted in a high sigma value associated with the track width variation.

The use of the exemplary dual damascene process set forth above enjoys various benefits, including freeing the write pole from the effects of photoresist residue by depositing (e.g., electroplating) the pole material across the wafer without a photo process, and a significant reduction in sigma associated with track width variation. With regard to the latter point, an average sigma of 2-3 nm has been demonstrated. The sigma reduction can be attributable to the following factors including: 1) the additional second media layer (e.g., Al₂O₃) 440 surrounding the top damascene trench 404 acting as a constant thickness (e.g., 0.2 µm) sacrificial layer for IBE and RIE to protect CMP stopper layer and reduce dishing around the pole area; 2) the increased thickness of the first mask layer 430, enhancing the CMP stopping function; and 3) the elimination of different frame masks used before the CMP process that tended to produce local topography. The CMP process can remove the additional second media layer 440 and can be stopped with a high accuracy and repeatability on the thicker and intact CMP stop layer.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method of forming a write pole, the method comprising:
    providing a structure comprising a bottom insulating layer and a top insulating layer separated by a bottom etch mask;
    forming a top damascene trench in the top insulating layer that extends vertically from the top of the bottom etch mask and a bottom damascene trench in the bottom insulating layer that extends vertically to the top of the bottom etch mask;
    filling the bottom damascene trench and a portion of the top damascene trench with a pole material; and
    removing the top insulating layer until the bottom etch mask is reached and removing the pole material located above the bottom damascene trench and within the top damascene trench until the bottom etch mask is reached.

2. The method of claim 1, wherein the bottom etch mask comprises a first patterned opening over the bottom insulating layer, and the bottom damascene trench is formed below the first patterned opening.

3. The method of claim 2, further comprising providing a top etch mask layer having a second patterned opening over the top insulating layer, wherein the top damascene trench is formed below the second patterned opening.

4. The method of claim 3, wherein the second patterned opening is located over the first patterned opening.

5. The method of claim 3, wherein a deposition process by which the bottom damascene trench and a portion of the top damascene trench are filled with the pole material also deposits a pole material above the top etch mask layer.

6. The method of claim 5, further comprising patterning a pole material protrusion from the pole material deposited above the top etch mask layer.

7. The method of claim 6, further comprising removing the pole material protrusion prior to removing the top insulating layer and the portion of the pole material located above the bottom damascene trench.

8. The method of claim 1, wherein the bottom insulating layer and the top insulating layer comprise $Al_2O_3$.

9. The method of claim 1, wherein the pole material comprises an element selected from the group consisting of cobalt (Co), nickel (Ni), and iron (Fe).

10. The method of claim 1, wherein removing the top insulating layer and the portion of the pole material located above the bottom damascene trench comprises performing a chemical-mechanical planarization (CMP) process.

\* \* \* \* \*